United States Patent
Koto et al.

(10) Patent No.: US 8,554,414 B2
(45) Date of Patent: Oct. 8, 2013

(54) ROLLOVER SUPPRESSION CONTROL APPARATUS AND ROLLOVER SUPPRESSION CONTROL METHOD

(75) Inventors: Hideaki Koto, Anjo (JP); Toshihisa Kato, Handa (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 217 days.

(21) Appl. No.: 13/227,819

(22) Filed: Sep. 8, 2011

(65) Prior Publication Data
US 2012/0065859 A1    Mar. 15, 2012

(30) Foreign Application Priority Data
Sep. 9, 2010    (JP) ................................. 2010-201982

(51) Int. Cl.
*B60R 21/0132* (2006.01)
*B62D 6/00* (2006.01)
*G06F 19/00* (2011.01)

(52) U.S. Cl.
USPC .................. 701/41; 701/38; 701/72; 280/5.5

(58) Field of Classification Search
USPC ........... 701/41, 43, 46, 38, 70, 72, 78, 83, 91; 180/422, 197; 280/5.5, 755, 5.502
See application file for complete search history.

(56) References Cited

U.S. PATENT DOCUMENTS

| 7,647,150 B2 * | 1/2010 | Katayama ........................ 701/43 |
| 2005/0012392 A1 | 1/2005 | Kato et al. |
| 2007/0219690 A1 * | 9/2007 | Ohkubo et al. ................. 701/41 |
| 2009/0099735 A1 * | 4/2009 | McCoy et al. .................. 701/46 |

FOREIGN PATENT DOCUMENTS

JP    2005-035451 A    2/2005

* cited by examiner

*Primary Examiner* — Tan Q Nguyen
(74) *Attorney, Agent, or Firm* — Buchanan Ingersoll & Rooney PC

(57) ABSTRACT

A rollover suppression control apparatus and method are provided. The apparatus includes a rollover state value detection unit which detects a rollover state value indicating that a vehicle is under rollover tendency, a braking force applying unit which performs a rollover suppression control of applying braking force to a wheel of the vehicle to suppress the rollover thereof when the detected rollover state value is greater than the control threshold value, a understeer state detection unit which detects whether a traveling state of the vehicle is a understeer state or a non-understeer state, and a setting unit which sets a first control threshold value as the control threshold value when the traveling state is detected as the non-understeer state, and which sets a second control threshold value greater than the first control threshold value as the control threshold value when the traveling state is detected as the understeer state.

4 Claims, 5 Drawing Sheets

ROLLOVER SUPPRESSION CONTROL APPARATUS AND ROLLOVER SUPPRESSION CONTROL METHOD

CROSS REFERENCE TO RELATED APPLICATIONS

This application is based on and claims priority under 35 U.S.C. §119 to Japanese Patent Application 2010-201982, filed on Sep. 9, 2010, the entire content of which is incorporated herein by reference.

BACKGROUND

1. Field of the Invention

The present invention relates to a rollover suppression control apparatus and a rollover suppression control method.

2. Description of Related Art

JP 2005-35451A describes a rollover suppression control apparatus. As shown in FIG. 3 of JP 2005-35451A, according to this rollover suppression control apparatus, under a rollover preventing control, while an absolute value $=|Gy|$ of actual lateral acceleration is between a rear-wheel-side reference value Gyr and a front-wheel-side reference value Gyf ($Gyr \leq |Gy| \leq Gyf$), inner wheel braking force corresponding to the absolute value of the actual lateral acceleration Gy is generated only for an inner rear wheel of a turning direction, so that vehicle height reduction force is generated at an inner rear part of a vehicle body with respect to the turning direction. In addition, while the absolute value $|Gy|$ of actual lateral acceleration is the front-wheel-side reference value Gyf or larger, the inner wheel braking force is kept being generated for the inner rear wheel of the turning direction and outer wheel braking force corresponding to the absolute value $|Gy|$ of actual lateral acceleration is also generated for an outer front wheel of the turning direction, so that yawing moment in an opposite direction to the turning direction is forcibly generated for the vehicle.

In other words, when the rollover suppression control is performed during the left turning of the vehicle, for example, the braking is made for the outer front wheel of the turning direction, so that the lateral acceleration for rollover suppression is generated in the left direction and the yawing moment is thus generated in the opposite direction to the yawing moment resulting from the turning. Accordingly, a degree of the rollover tendency is decreased to suppress the rollover.

In the meantime, when the applied braking force is as high as a friction limit of a vehicle tire, the lateral force for turning is reduced, so that understeer is generated. That is, the traveling direction may be deviated from a desired range due to the braking force applied by the rollover suppression control.

SUMMARY

The present invention has been made in view of the above circumstances, and it is an object of the present invention to provide a rollover suppression control apparatus and a rollover suppression control method capable of suppressing understeer due to braking force applied by a rollover suppression control and thus securing a turning trace while suppressing a rolling.

According to an illustrative embodiment of the present invention, there is provide a rollover suppression control apparatus comprising: a rollover state value detection unit which detects a rollover state value indicating that a vehicle is under rollover tendency; a comparison unit which compares the detected rollover state value with a control threshold value; a braking force applying unit which performs a rollover suppression control of applying braking force to a wheel of the vehicle to suppress the rollover of the vehicle when the detected rollover state value is greater than the control threshold value; a understeer state detection unit which detects whether a traveling state of the vehicle is a understeer state or a non-understeer state; and a control threshold value setting unit which sets a first control threshold value as the control threshold value when the traveling state is detected as the non-understeer state, and which sets a second control threshold value greater than the first control threshold value as the control threshold value when the traveling state is detected as the understeer state.

According to the above configuration, the control threshold value for starting the rollover suppression control is set to a greater value, compared to the non-understeer state. Thereby, it is possible to delay the start of applying the braking force by the rollover suppression control and further to delay the approaching to a friction limit of a tire. Hence, it is possible to suppress the lateral force from being decreased during the rollover suppression control and further to suppress the degree of the understeer from being increased in advance. Accordingly, it is possible to secure a turning trace while suppressing a rolling, by suppressing the traveling direction from being deviated from a desired range.

According to another illustrative embodiment of the present invention, there is provided a rollover suppression control method comprising: detecting whether a traveling state of a vehicle is a understeer state or a non-understeer state; setting a first control threshold value as a control threshold value when the traveling state is detected as the non-understeer state, and setting a second control threshold value greater than the first control threshold value when the traveling state is detected as the understeer state; detecting a rollover state value indicating that the vehicle is under rollover tendency; comparing the detected rollover state value with the set control threshold value; and performing a rollover suppression control of applying braking force to a wheel of the vehicle to suppress rollover of the vehicle when the detected rollover state value is greater than the control threshold value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
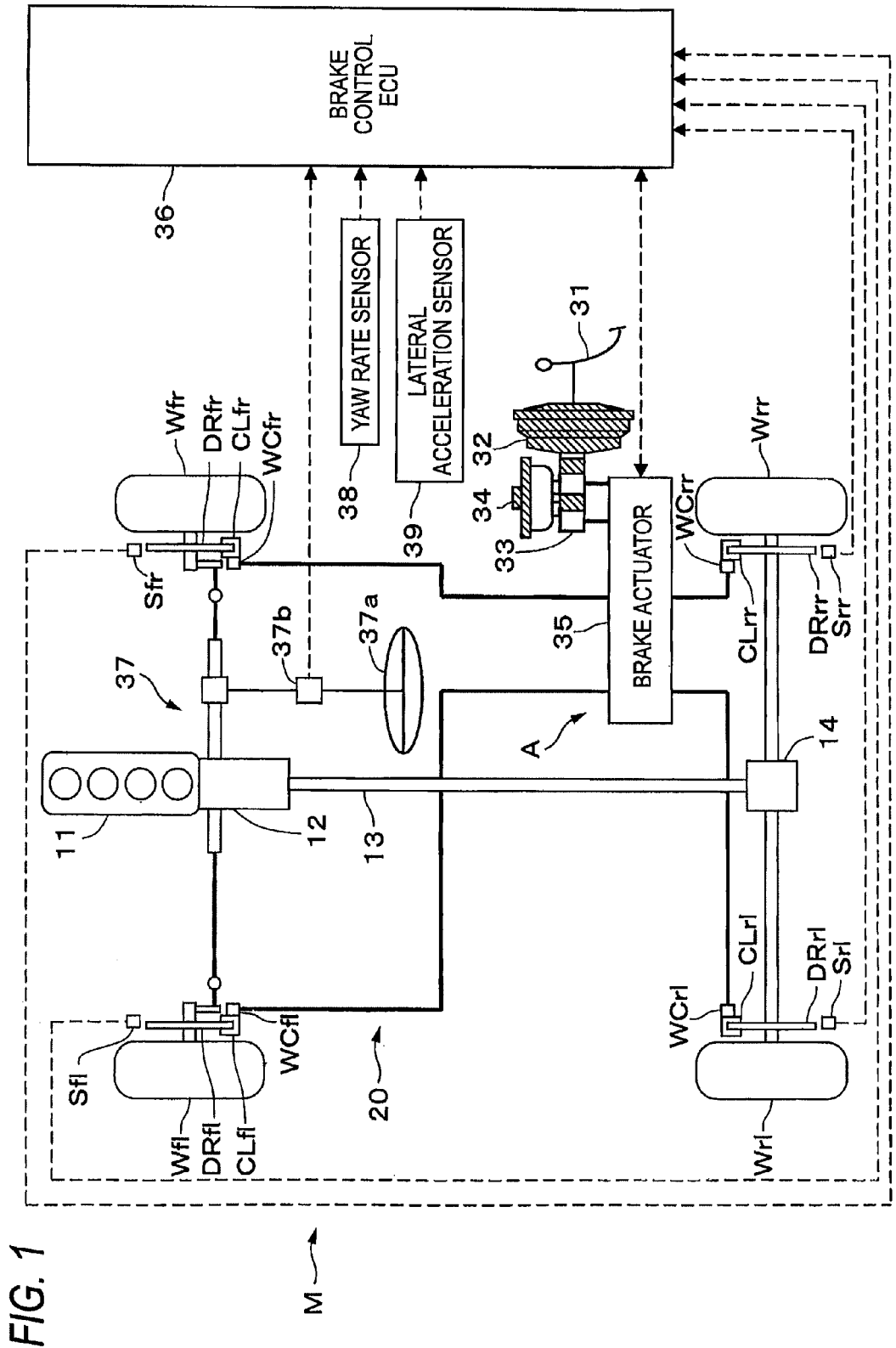
FIG. 1 is a schematic view showing a vehicle having a rollover suppression control apparatus according to an illustrative embodiment of the present invention.
Figure 2:
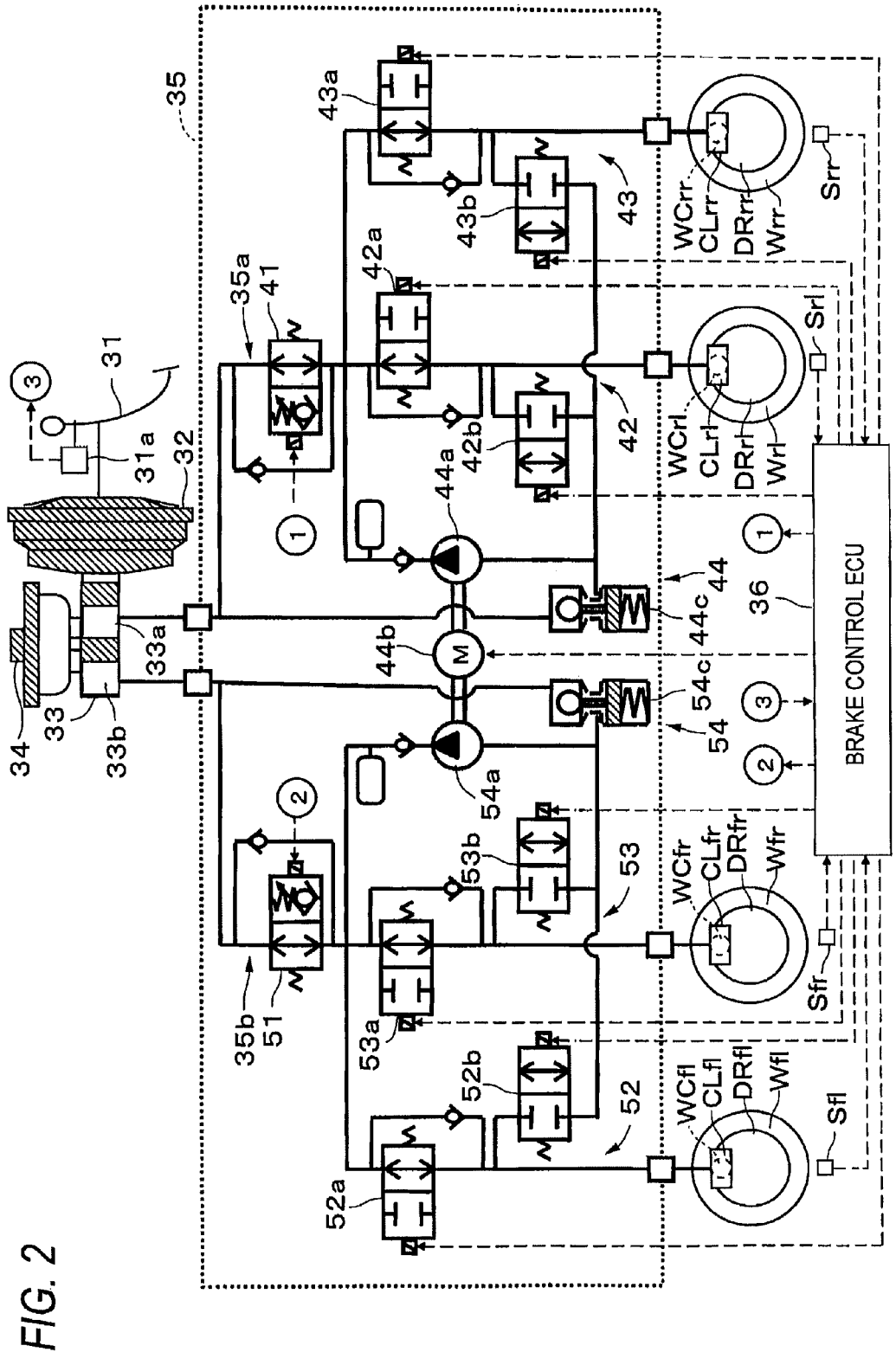
FIG. 2 is a schematic view showing a fluid pressure brake apparatus shown in FIG. 1.

Hereinafter, a vehicle having a rollover suppression control apparatus according to an illustrative embodiment of the present invention will be described with reference to the drawings. FIG. 1 is a schematic view showing a configuration of the vehicle and FIG. 2 is a schematic view showing a fluid pressure brake apparatus A shown in FIG. 1. The vehicle M has a vehicle type in which driving force of an engine 11, which is a driving source mounted to a front side part of the vehicle, is transmitted to rear wheels, which are driving wheels. The vehicle M is a vehicle (for example, truck) that can load baggage, freight and the like. In the meantime, front wheels are steering wheels for arbitrarily changing a traveling direction of the vehicle. It is noted that the vehicle M may have the other driving manner, for example, front-wheel drive vehicle or four-wheel drive vehicle, rather than the rear-wheel drive vehicle.

The vehicle M has the engine 11, a transmission 12, a propeller shaft 13, a differential gear 14, left and right front wheels Wfl, Wfr and left and right rear wheels Wrl, Wrr. The driving force of the engine 11 is gear-shifted by the transmission 12 and is respectively transmitted to the left and right rear wheels Wrl, Wrr via the propeller shaft 13 and the differential gear 14.

The vehicle M has a rollover suppression control apparatus 20. The rollover suppression control apparatus 20 includes the fluid pressure brake apparatus A, a steering sensor 37b, a yaw rate sensor 38 and a lateral acceleration sensor 39.

The vehicle M has the fluid pressure brake apparatus A that directly applies fluid pressure braking force to the respective wheels Wfl, Wfr, Wrl, Wrr and thus brakes the vehicle. As shown in FIG. 2, the fluid pressure brake apparatus A has respective wheel cylinders WCfl, WCfr, WCrl, WCrr, a brake pedal 31 that is a brake operation member, a vacuum brake booster 32, a master cylinder 33, a reservoir tank 34, a brake actuator 35 that is a fluid pressure generation apparatus (braking force application) and a brake control ECU 36.

Next, the fluid pressure brake apparatus A is specifically described. The respective wheel cylinders WCfl, WCfr, WCrl, WCrr are to respectively regulate rotations of the respective wheels Wfl, Wfr, Wrl, Wrr and are provided to respective calipers CLfl, CLfr, CLrl, CLrr. When at least one of a basic fluid pressure and a control fluid pressure is supplied to the respective wheel cylinders WCfl, WCfr, WCrl, WCrr, respective pistons (not shown) of the respective wheel cylinders WCfl, WCfr, WCrl, WCrr press a pair of brake pads (not shown), which are frictional members, thereby nipping disc rotors DRfl, DRfr, DRrl, DRrr, which are rotational members integrally rotating with the respective wheels Wfl, Wfr, Wrl, Wrr, from both sides thereof and regulating the rotations thereof. In this illustrative embodiment, although the disc-type brake is used, a drum-type brake may be used instead.

The vacuum brake booster 32 applies a negative suction pressure of the engine 11 to a diaphragm, thereby extending and boosting (increasing) brake operating force resulting from a depressing of the brake pedal 31.

The master cylinder 33 is an apparatus that converts the operating force of the brake pedal 31 by a driver to form the basic fluid pressure and generate the frictional braking force for the wheels Wfl, Wfr, Wrl, Wrr by the basic fluid pressure. In this illustrative embodiment, the master cylinder 33 converts the brake operating force boosted by the vacuum brake booster 32 into the basic fluid pressure and supplies the same to the respective wheel cylinders WCfl, WCfr, WCrl, WCrr.

The reservoir tank 34 is to store a brake fluid therein and to supply the brake fluid to the master cylinder 33.

The brake actuator 35 is an apparatus that is provided between the master cylinder 33 and the respective wheel cylinders WCfl, WCfr, WCrl, WCrr, applies the control fluid pressure, which is automatically formed regardless of whether the operation of the brake pedal 31, to the wheel cylinders WCfl, WCfr, WCrl, WCrr and generates the frictional braking force for the corresponding wheels Wfl, Wfr, Wrl, Wrr.

A configuration of the brake actuator 35 is specifically described with reference to FIG. 2. The brake actuator 35 has a plurality of systems, which are independently operating fluid pressure circuits. Specifically, the brake actuator 35 has a first system 35a and a second system 35b that are front and rear conduit. The first system 35a communicates a first fluid pressure chamber 33a of the master cylinder 33 with the wheel cylinders WCrl, WCrr of the left rear wheel Wrl and the right rear wheel Wrr and is a system for braking force control of the left rear wheel Wrl and the right rear wheel Wrr. The second system 35b communicates a second fluid pressure chamber 33b of the master cylinder 33 with the wheel cylinders WCfl, WCfr of the left front wheel Wfl and the right front wheel Wfr and is a system for braking force control of the left front wheel Wfl and the right front wheel Wfr.

The first system 35a has a differential pressure control valve 41, a left rear wheel fluid pressure control unit 42, a right rear wheel fluid pressure control unit 43 and a first pressure decrease unit 44.

The differential pressure control valve 41 is a normally-open linear electromagnetic valve (normally-open linear solenoid valve) that is interposed between the master cylinder 33 and upstream sides of the left rear wheel fluid pressure control unit 42 and the right rear wheel fluid pressure control unit 43. The differential pressure control valve 41 is switched between a communication state (non-differential pressure state) and a differential pressure state by the brake control ECU 36. The differential pressure control valve 41 is normally under communication state when the current does not flow. However, when the current flows, the differential pressure control valve is thus under differential pressure state (closed state), so that it is possible to maintain the fluid pressures of the wheel cylinders WCrl, WCrr higher than the fluid pressure of the master cylinder 33 by a predetermined control differential pressure. The control differential pressure is adjusted by the brake control ECU 36 according to control current. Accordingly, the control fluid pressure corresponding to the control differential pressure is formed based on pressurization by a pump 44a.

The left rear wheel fluid pressure control unit 42 can control the fluid pressure that is supplied to the wheel cylinder WCrl and has a pressure increase valve 42a that is a normally-open electromagnetic opening and closing valve of a two-port and two-position switching type and a pressure decrease valve 42b that is a normally-close electromagnetic opening and closing valve of a two-port and two-position switching type. The pressure increase valve 42a is interposed between the differential pressure control valve 41 and the wheel cylinder WCrl and is adapted to communicate or cut off the differential pressure control valve 41 and the wheel cylinder WCrl according to an instruction of the brake control ECU 36. The pressure decrease valve 42b is interposed between the wheel cylinder WCrl and a pressure adjusting reservoir 44c and is adapted to communicate or cut off the wheel cylinder WCrl and the pressure adjusting reservoir 44c according to an instruction of the brake control ECU 36. Accordingly, the fluid pressure in the wheel cylinder WCrl can be increased, maintained and decreased.

The right rear wheel fluid pressure control unit 43 can control the fluid pressure that is supplied to the wheel cylinder WCrr and has a pressure increase valve 43a and a pressure decrease valve 43b, like the left rear wheel fluid pressure control unit 42. The pressure increase valve 43a and the pressure decrease valve 43b are controlled according to instructions of the brake control ECU 36, so that the fluid pressure in the wheel cylinder WCrr can be increased, maintained and decreased.

The first pressure decrease unit 44 has the pump 44a, a motor 44b for pump and the pressure adjusting reservoir 44c. The pump 44a pumps brake fluid in the pressure adjusting reservoir 44c and supplies the pumped brake fluid between the differential pressure control valve 41 and the pressure increase valves 42a, 43a. The pump 44a is driven by the motor 44b that is operated according to an instruction of the brake control ECU 36.

The pressure adjusting reservoir 44c is to preserve the brake fluids pumped from the wheel cylinders WCrl, WCrr through the pressure decrease valves 42b, 43b. The pressure adjusting reservoir 44c communicates with the master cylinder 33. When the brake fluid in the pressure adjusting reservoir 44c is a predetermined amount or smaller, the brake fluid is supplied from the master cylinder 33. When the brake fluid in the pressure adjusting reservoir 44c is larger than the predetermined amount, the supply of the brake fluid from the mast cylinder 33 is stopped.

Accordingly, when the differential pressure state is formed by the differential pressure control valve 41 and the pump 44a is operated (for example, rollover suppression control, sideslip prevention control, traction control and the like), the brake fluid that is being supplied from the master cylinder 33 can be supplied to the upstream sides of the pressure increase valves 42a, 43a via the pressure adjusting reservoir 44c.

The second system 35b has a differential pressure control value 51, a left front wheel fluid pressure control unit 52, a right front wheel fluid pressure control unit 53 and a second pressure decrease unit 54.

The differential pressure control valve 51 is a normally-open linear electromagnetic valve that is interposed between the master cylinder 33 and upstream sides of the left front wheel fluid pressure control unit 52 and the right front wheel fluid pressure control unit 53. The differential pressure control valve 41 is adapted to maintain the fluid pressures of the wheel cylinders WCfl, WCfr higher than the fluid pressure of the master cylinder 33 by a predetermined control differential pressure by the brake control ECU 36, like the differential pressure control valve 41.

The left front wheel fluid pressure control unit 52 and the right front wheel fluid pressure control unit 53 can respectively control the fluid pressures that are supplied to the wheel cylinders WCfl, WCfr and have a pressure increase valve 52a and a pressure decrease valve 52b and a pressure increase valve 53a and a pressure decrease valve 53b, respectively, like the left rear wheel fluid pressure control unit 42. The pressure increase valve 52a and the pressure decrease valve 52b and the pressure increase valve 53a and a pressure decrease valve 53b are respectively controlled according to instructions of the brake control ECU 36, so that the fluid pressures in the wheel cylinder WCfl and the wheel cylinder WCfr can be increased, maintained and decreased.

Like the first pressure decrease unit 44, the second pressure decrease unit 54 has a pump 54a, the motor 44b for pump (which is commonly used to the first pressure decrease unit 44) and a pressure adjusting reservoir 54c. The pump 54a pumps brake fluid in the pressure adjusting reservoir 54c similar to the pressure adjusting reservoir 44c and supplies the pumped brake fluid between the differential pressure control valve 51 and the pressure increase valves 52a, 53a. The pump 54a is driven by the motor 44b for pump that is operated according to the instruction of the brake control ECU 36.

According to the brake actuator 35 configured as described above, all the electromagnetic valves are non-excited at a normal braking operation, so that the brake actuator can supply the brake fluid pressure corresponding to the operating force of the brake pedal 31, i.e., the basic fluid pressure to the wheel cylinders WC, respectively. In the meantime, the symbol '' indicates a suffix corresponding to each wheel and is one of fl, fr, rl and rr, which indicate the left front wheel, the right front wheel, the left rear wheel and the right rear wheel, respectively. This is also the same in the below descriptions and the drawings.

Also, when the motor 44b, i.e., the pumps 44a, 54a are driven and the differential pressure control valves 41, 51 are excited, the brake fluid pressure having the control fluid pressure added to the basic fluid pressure from the master cylinder 33 can be respectively supplied to the wheel cylinders WC**.

Further, the brake actuator 35 is adapted to control the pressure increase valves 42a, 43a, 52a, 53a and the pressure decrease valves 42b, 43b, 52b, 53b and thus to individually adjust the fluid pressures of the wheel cylinders WC. Therefore, according to the instructions from the brake control ECU 36**, it is possible to implement the well-known anti-skid control, front and rear braking force distribution control, sideslip prevention control (specifically, understeer suppression control, over-steer suppression control) that is ESC (Electronic Stability Control), traction control, inter-vehicle distance control, rollover suppression control and the like.

Also, the fluid pressure brake apparatus A has wheel speed sensors Sfl, Sfr, Srl, Srr. The wheel speed sensors Sfl, Sfr, Srl, Srr are respectively provided adjacent to the respective wheels Wfl, Wfr, Wrl, Wrr and output pulse signals of frequencies corresponding to the rotations of the respective wheels Wfl, Wfr, Wrl, Wrr to the brake control ECU 36.

The fluid pressure brake apparatus A has a stop switch 31a that becomes ON when the brake pedal 31 is depressed and becomes OFF when the brake pedal 31 is released. The ON and OFF signals of the stop switch 31a are input to the brake control ECU 36.

Also, as shown in FIG. 1, the vehicle M has a steering apparatus 37 including a steering 37a and the steering sensor 37b. The steering 37a is connected to the steering wheels (left and right front wheels) and arbitrarily changes a direction of the steering wheels according to an operation of a driver. The steering sensor 37b detects an operating amount (rotating angle) of the steering 37a. A total gear ratio of a steering gear mechanism of the steering apparatus 37 is set with a predetermined value and is a value that is indicated by a rotating angle (handle angle) of the steering 37a/a steering angle of the steering wheels. That is, the steering sensor 37b severs as a steering angle sensor that detects a steering angle of the steering wheels.

Further, the vehicle M has the yaw rate sensor 38 and the lateral acceleration sensor 39. The yaw rate sensor 38 is provided adjacent to the center of gravity of the vehicle body and detects an actual yaw rate that is generated at the vehicle body. The lateral acceleration sensor 39 is provided adjacent to the center of gravity of the vehicle body and detects actual lateral acceleration that is generated at the vehicle body. The lateral acceleration sensor 39 is an example of a rollover state value detection unit that detects a rollover state value indicating a rollover tendency of a vehicle. The lateral acceleration is one example of the rollover state value.

Further, the vehicle M has the brake control ECU 36. The brake control ECU 36 is a control apparatus for controlling a vehicle motion (vehicle posture) (for example, rollover suppression control, ABS control, ESC (sideslip prevention control)) and receives the respective detection signals from the steering angle sensor 37b, the yaw rate sensor 38 and the lateral acceleration sensor 39 and the respective detection signals from the respective wheel speed sensors Sfl, Sfr, Srl, Srr, which detect the wheel speeds of the respective wheels Wfl, Wfr, Wrl, Wrr, thereby calculating various physical quantities. The brake control ECU 36 calculates a steering angle corresponding to an operating amount of the steering 37a by a driver, which is output by the steering angle sensor 37b, calculates an actual yaw rate based on a detection signal corresponding to an actual yaw rate generated at the vehicle, which is output by the yaw rate sensor 38, and calculates actual lateral acceleration based on a detection signal corresponding to actual lateral acceleration generated at the vehicle, which is output by the lateral acceleration sensor 39. Also, the brake control ECU is adapted to calculate the wheel speeds of the respective wheels Wfl, Wfr, Wrl, Wrr and the vehicle speed (vehicle body speed), based on the detection signals from the respective wheel speed sensors Sfl, Sfr, Srl, Srr.

The brake control ECU 36 has a microcomputer (not shown). The microcomputer has an I/O interface, a CPU, a RAM and a ROM (all of which are not shown), which are respectively connected via a bus. The CPU executes a program corresponding to a flowchart shown in FIG. 3 and performs the rollover suppression control such that the vehicle is not rolled over. The RAM temporarily stores therein parameters that are required to execute the program. The ROM stores therein the program.

Figure 3:
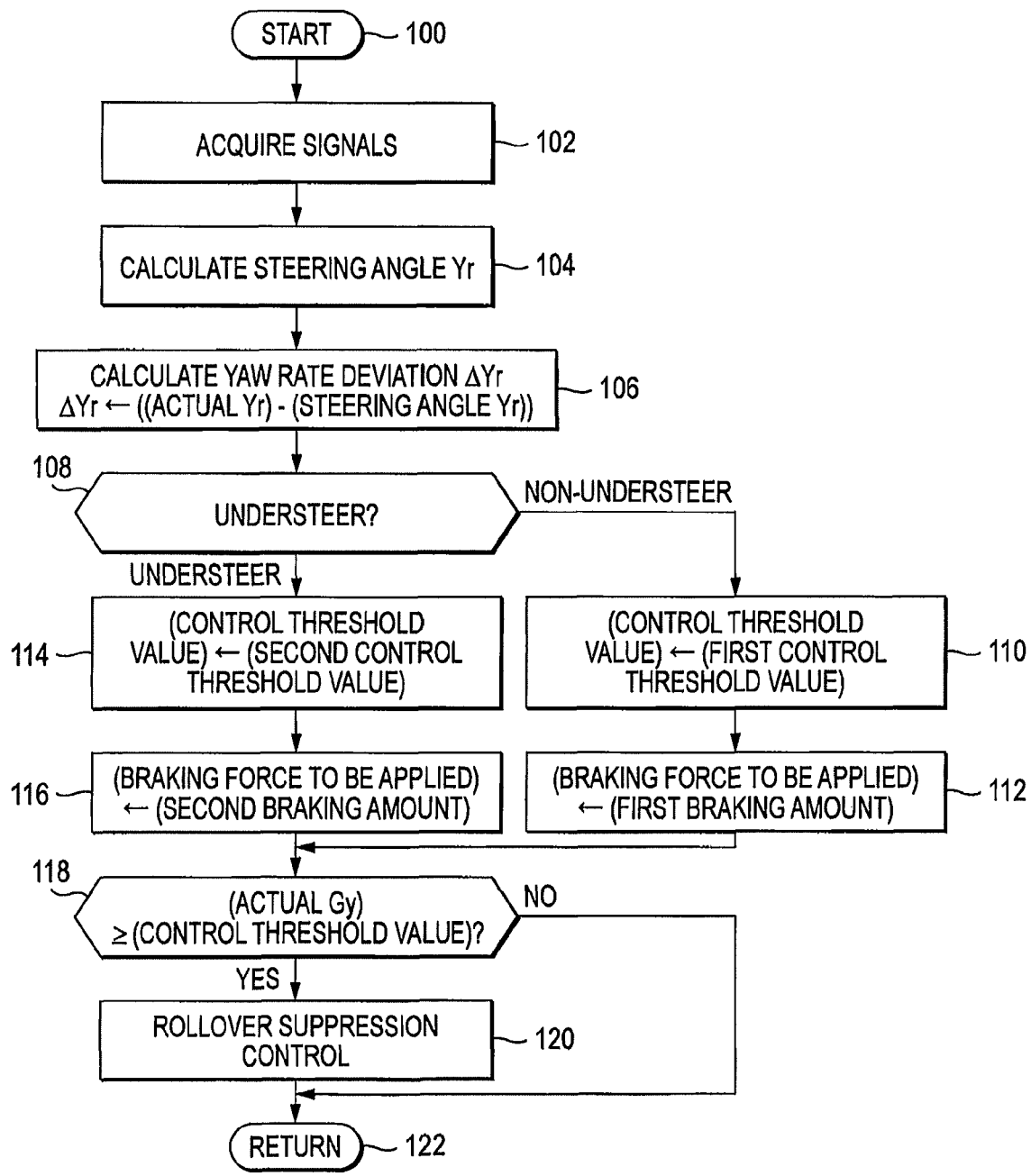
FIG. 3 is a flowchart of a control program that is executed by a brake control ECU shown in FIG. 1.

In the below, the operations of the rollover suppression control apparatus configured as described above are described with reference to the flowchart shown in FIG. 3. When an ignition switch (not shown) of the vehicle M is ON state, the brake control ECU 36 repeatedly executes the program corresponding to the flowchart of FIG. 3 every predetermined short time. Each time the program is started in step 100, the brake control ECU 36 acquires the lateral acceleration Gy, the respective wheel speeds Vfl, Vfr, Vrl, Vrr, the vehicle speed V, the handle angle θ and the actual yaw rate (actual Yr) (step 102).

Specifically, the brake control ECU 36 acquires, as the actual lateral acceleration Gy generated at the vehicle, a signal indicating a direction and a magnitude of the lateral acceleration from the lateral acceleration sensor 39 (a rollover state value detection). Here, the roll tendency of the vehicle may be detected by not only the method of detecting the lateral acceleration Gy but also a method of detecting a roll angular velocity about a gravity center of the vehicle by a roll angular velocity sensor and integrating the value. Also, the roll tendency may be detected from a vehicle height, vertical acceleration and the like detected by a vehicle height sensor, a vertical acceleration sensor and the like. That is, the roll angular velocity, the integral value of the roll angular velocity, the vehicle height and the vertical acceleration can be also used as the rollover state value.

The brake control ECU 36 acquires the wheel speeds Vfl, Vfr, Vrl, Vrr of the respective wheels Wfl, Wfr, Wrl, Wrr and the vehicle body speed V (wheel speed acquisition, vehicle body speed acquisition). Specifically, based on the respective pulse train signals input from the wheel speed sensors Sfl, Sfr, Srl, SlT, the brake control ECU calculates values inversely proportional to the periods of the respective pulse train signals as the respective wheel speeds Vfl, Vfr, Vrl, Vrr. The brake control ECU calculates an average value of the respective wheel speeds as the vehicle body speed V. In the meantime, the brake control ECU may calculate an average value of the respective wheel speeds of the left and right wheels Wfl, Wfr or left and right rear wheels Wrl, Wrr as the vehicle body speed V. In addition, a vehicle speed sensor, which picks up the rotation of an output shaft of the transmission 12 and outputs a pulse train signal having a period inversely proportional to the rotating speed, may be connected to the brake control ECU 36 and the brake control ECU 36 may calculate, based on the pulse train signal input from the vehicle speed sensor, a value inversely proportional to the period of the pulse train signal as the vehicle body speed V.

The brake control ECU 36 calculates the handle angle θ of the vehicle M. In other words, as indicated in a following equation 1, based on the two-phase pulse train signal input from the steering sensor 37b, the handle angle θ is calculated by increasing/decreasing a previous handle angle θ by a predetermined angle Δθ in accordance with a rotating direction (which is detected by a behavior of a level change of the two-phase pulse train signal) of the steering shaft (steering 37a) each time levels of both pulse train signals are changed.

handle angle θ=previous handle angle θ+additional value×Δθ  (equation 1)

The additional value of this equation 1 indicates the rotating direction of the steering 37a and is determined based on the change behavior of the previous and current values of the two-phase pulse train signal input from the steering sensor 37b. For example, when the previous and current values are the same such as (0, 0), the additional value is 0 (zero). When the previous values of (0, 0) become (0, 1), the additional value is +1, and when the previous values of (0, 0) become (1, 0), the additional value is −1.

Immediately after the ignition switch (not shown) is ON, the initial value of the handle angle θ is reset. Based on this, the calculation of the handle angle θ thereafter is executed. In addition, the handle angle θ simply indicates a relative angle from the initial value and does not indicate an absolute angle. Therefore, after a neutral point of the handle angle θ is calculated and the handle angle is corrected based on the calculated neutral point, the handle angle θ that is an absolute angle from the neutral point is first calculated.

In addition, the brake control ECU 36 substitutes the handle angle θ and the predetermined total gear ratio N into an equation 2 and thus calculates the steering angle ξ of the steering wheels (steering angle acquisition).

Steering angle ξ of steering wheels=Handle angle θ/total gear ratio N  (equation 2)

The steering angle ξ of steering wheels means an angle of a steering direction of the steering wheels with respect to the straight traveling direction of the vehicle M.

The brake control ECU 8 acquires a signal indicating a direction and a magnitude of the yaw rate from the yaw rate sensor 38, as an actual yaw rate (actual Yr) that is an actual yaw rate generated at the vehicle (actual yaw rate acquisition). In the meantime, the actual yaw rate may be calculated based on the wheel speeds of the left and right front wheels Wfl, Wfr (or left and right rear wheels Wrl, Wrr).

When the acquisitions of the respective parameters are completed, the brake control ECU 36 calculates a steering angle yaw rate (steering angle Yr) in step S104 (steering angle yaw rate calculation). Specifically, the brake control ECU 36 substitutes the acquired vehicle body speed V and the steering angle ξ of the steering wheels into an equation 3 and thus calculates the steering angle Yr.

$$\text{Steering angle } Yr = \frac{V \cdot \xi}{L} \cdot \frac{1}{1 + A \cdot V^2} \quad \text{(equation 3)}$$

Here, L is a wheelbase of the vehicle M and A is a stability factor.

In step 106, the brake control ECU 36 calculates a yaw rate deviation ΔYr that is a deviation between the acquired yaw rate (actual Yr) and the calculated steering angle yaw rate (steering angle Yr) (yaw rate deviation calculation).

Then, the brake control ECU 36 detects whether the traveling state of the vehicle is the understeer state or non-understeer state in step 108 (understeer state detection). Specifically, the brake control ECU 36 compares the yaw rate deviation ΔYr calculated in step 106 with a preset threshold value Tus. When the yaw rate deviation ΔYr is greater than the threshold value Tus, the brake control ECU detects that the vehicle M is at the understeer tendency (state). On the other hand, when the yaw rate deviation ΔYr is smaller than the threshold value Tus, the brake control ECU detects that the vehicle M is at the non-understeer tendency (state) at which the vehicle M is not at the understeer tendency (state).

In the meantime, the understeer state detection may be based on the lateral acceleration, rather than the yaw rate. Specifically, the understeer state detection may be performed by calculating a deviation between the actual lateral acceleration and the lateral acceleration calculated from the steering angle. When the deviation is greater than a predetermined value, the vehicle may be detected as at the understeer state.

Also, the understeer state detection may be based on a slip ratio of the outer front wheel of the turning direction and wheel deceleration, instead of the yaw rate. Specifically, when a slip ratio of the outer front wheel of the turning direction with respect to the vehicle body speed is greater than a predetermined value, the vehicle may be detected as at the understeer state. When wheel deceleration of the outer front wheel of the turning direction (which can be calculated by differentiating the wheel speed) is greater than a predetermined value, the vehicle may be detected as at the understeer state.

When it is detected that the vehicle is at the non-understeer state, the brake control ECU 36 proceeds to step 110 and sets a first control threshold value as a control threshold value for starting the rollover suppression control (which will be described later) (step 110: control threshold value setting). Further, the brake control ECU 36 sets a first braking amount as an amount of the braking force, which is applied by the rollover suppression control (which will be described later) (step 112: braking amount setting).

On the other hand, when it is detected that the Vehicle is at the understeer state, the brake control ECU 36 proceeds to step 114 and sets a second control threshold value greater than the first control threshold value as the control threshold value (step 114: control threshold value setting). Further, the brake control ECU sets a second braking amount smaller than the first braking amount as the amount of the braking force, which is applied by the rollover suppression control (which will be described later) (step 116: braking amount setting).

Figure 4:
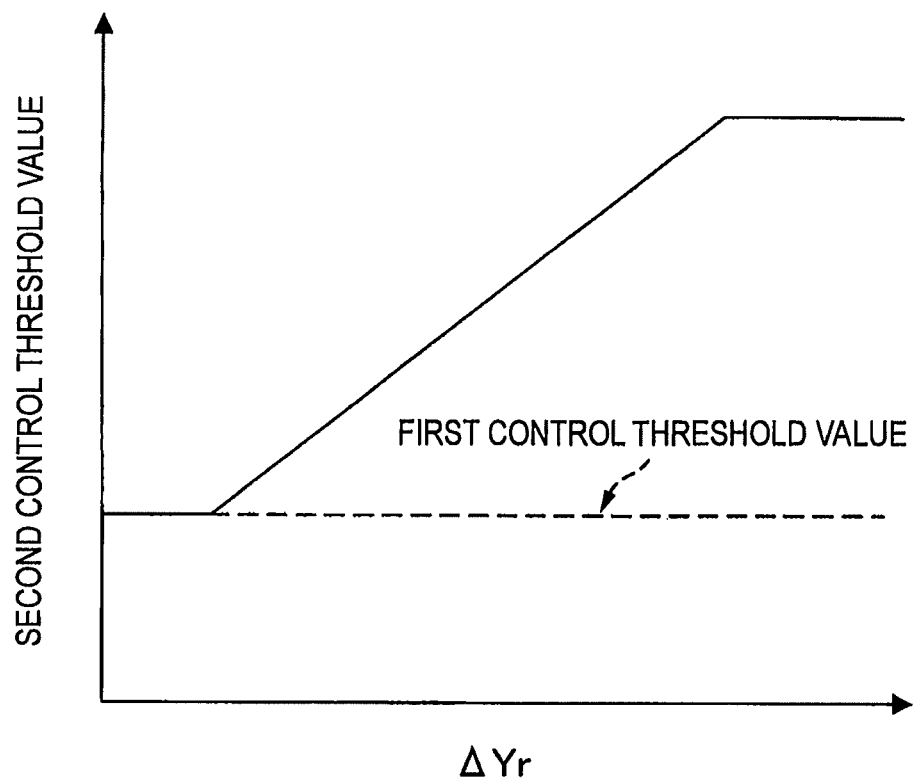
FIG. 4 is a graph showing a relation between a yaw rate deviation and a second control threshold value.

In the meantime, the second control threshold value may be set according to a degree of the understeer state of the vehicle M. For example, the second control threshold value may be calculated from a relation between the yaw rate deviation ΔYr and the second control threshold value, which is shown in FIG. 4, and the calculated yaw rate deviation ΔYr.

Then, in step 118, the brake control ECU 36 compares the lateral acceleration (rollover state value) acquired in step 102 with the control threshold value set in step 110 or step 114 (comparison). When the lateral acceleration acquired in step 102 is not smaller than the control threshold value set in step 110 or step 114, the brake control ECU 36 determines "YES" in step 118 and proceeds to step 120 to perform the rollover suppression control for suppressing the rollover of the vehicle M. On the other hand, when the lateral acceleration acquired in step 102 is smaller than the control threshold value set in step 110 or step 114, the brake control ECU 36 determines "NO" in step 118 and proceeds to step 122 to return to step 100 without performing the rollover suppression control of the vehicle M.

In step 120, the brake control ECU 36 performs the rollover suppression control of applying the braking force to the wheels of the vehicle M to thus suppress the rollover of the vehicle (braking force applying). At this time, for example, the brake control ECU determines whether the vehicle is turning right or left based on the actual yaw rate or steering angle acquired in step 102 and controls the brake actuator 35 so as to generate the braking force for the target wheels corresponding to the turning direction. The rollover suppression control means a control for applying the braking force to at least one or more wheels. For example, the braking force is controlled to be applied to the outer front and rear wheels. If the brake actuator 35 has the high pumping capability, the brake control ECU controls the brake actuator to apply the braking force to all the four wheels.

Accordingly, when the vehicle M is at the understeer state, as the control threshold value for starting the rollover suppression control, a greater value is set compared to the non-understeer state. Therefore, it is possible to delay the start of applying the braking force by the rollover suppression control and further to delay the approaching to a friction limit of a tire.

Also, the braking amount of the braking force that is applied at that time is the first braking amount or the second braking amount smaller than the first braking amount set in step 112 or step 116. Therefore, when the vehicle M is at the non-understeer state, it is possible to apply the braking force having the relatively large first braking amount. On the other hand, when the vehicle M is at the understeer state, it is possible to apply the braking force having the relatively small second braking amount.

It is noted that even at the non-understeer state or understeer state, the braking force of the same braking amount may be applied. In this case, the steps 112, 116 may be omitted.

Figure 5:
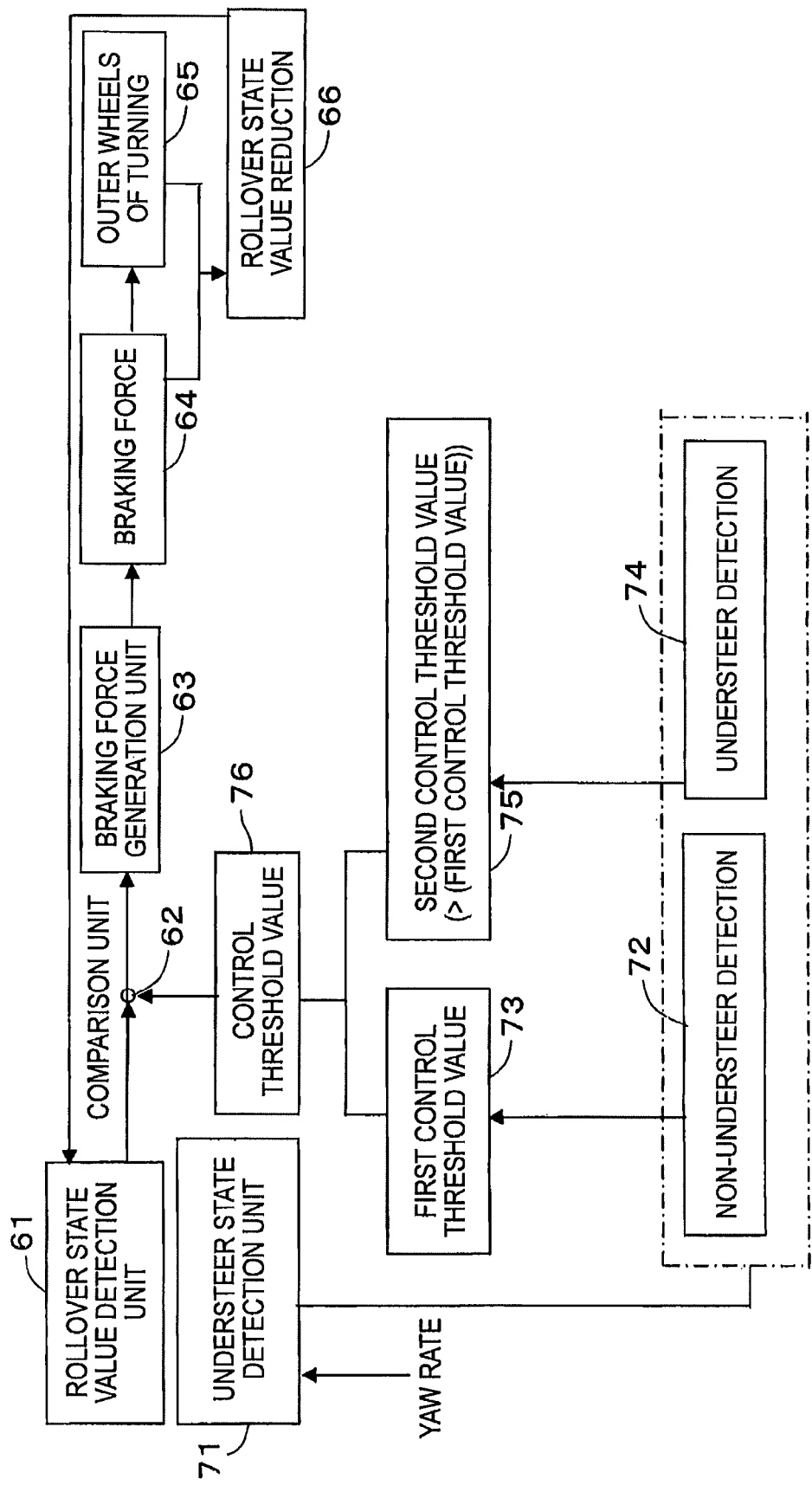
FIG. 5 is a block diagram of the control program that is executed by the brake control ECU shown in FIG. 1.

Further, operation is described with reference to a block diagram shown in FIG. 5. A rollover state value detection unit 61 detects a rollover state value (for example, lateral acceleration) indicating that the vehicle is under the rollover tendency. A comparison unit 62 compares the lateral acceleration (rollover state value), which is detected by the rollover state value detection unit 61, with a control threshold value (76) that is set as described later. A braking force generation unit (braking force applying unit) 63 performs the rollover suppression control of applying the barking force to the wheels of the vehicle M (for example, outer wheels of the turning direction) to thus suppress the rollover of the vehicle. Thereby, the braking force (64) is applied to the outer wheels (65) and the rollover state value (lateral acceleration) is reduced (66).

An understeer state detection unit 71 detects whether the traveling state of the vehicle is the understeer state or non-understeer state from the actual yaw rate and the steering angle yaw rate. When it is detected that the vehicle is at the non-understeer state (72), the first control threshold value (73) is set as the control threshold value for starting the rollover suppression control. On the other hand, when it is detected that the vehicle is at the understeer state (74), the second control threshold value (75) greater than the first control threshold value is set as the control threshold value.

As can be clearly seen from the above descriptions, according to this illustrative embodiment, the understeer state detection unit (step 108, 71) detects whether the traveling state of the vehicle is the understeer state or non-understeer state. When it is detected that the vehicle is at the non-understeer state, the control threshold setting unit (steps 110, 114, 72, 73, 74, 75) sets the first control threshold value as the control threshold value, and when it is detected that the vehicle is at the understeer state, the control threshold setting unit sets the second control threshold value greater than the first control threshold value as the control threshold value. When the detected rollover state value is greater than the control threshold value, the braking force applying unit (step 120, 63) performs the rollover suppression control of applying the braking force to the wheels of the vehicle to thus suppress the rollover of the vehicle.

That is, when the vehicle M is at the understeer state, the control threshold value for starting the rollover suppression control is set to the greater value (second control threshold value), compared to the non-understeer state. Accordingly, it is possible to delay the start of applying the braking force by the rollover suppression control and further to delay the approaching to a friction limit of a tire. Therefore, it is possible to suppress the lateral force from being decreased during the rollover suppression control and further to suppress the degree of the understeer from being increased in advance. Accordingly, it is possible to secure a turning trace while suppressing a rolling, by suppressing the traveling direction from being deviated from a desired range.

In the meantime, even when the vehicle body is under sideslip state at the understeer state although it is at the state in which the yaw rate deviation is large, a possibility that the rollover will occur is low until the actual lateral acceleration exceeds the control threshold value. Also, in the understeer suppression control, the yaw rate is controlled such that it does not exceed a preset threshold value.

The second control threshold value is set according to the degree of the understeer state of the vehicle. Therefore, since it is possible to appropriately set the second control threshold value according to the degree of the understeer state, it is possible to beforehand suppress the degree of the understeer state from being increased more appropriately.

Also, when it is detected that the vehicle is at the non-understeer state, the braking amount setting unit (steps 112, 116) sets the first braking amount as the braking amount, and when it is detected that the vehicle is at the understeer state, the braking amount setting unit sets the second braking amount smaller than the first braking amount as the braking amount. Therefore, since it is possible to suppress the braking force, which is applied by the rollover suppression control, to be relatively smaller, it is possible to suppress the degree of the understeer from being increased.

What is claimed is:

1. A rollover suppression control apparatus comprising:
    a rollover state value detection unit which detects a rollover state value indicating that a vehicle is under rollover tendency;
    a comparison unit which compares the detected rollover state value with a control threshold value;
    a braking force applying unit which performs a rollover suppression control of applying braking force to a wheel of the vehicle to suppress the rollover of the vehicle when the detected rollover state value is greater than the control threshold value;
    a understeer state detection unit which detects whether a traveling state of the vehicle is a understeer state or a non-understeer state; and
    a control threshold value setting unit which sets a first control threshold value as the control threshold value when the traveling state is detected as the non-understeer state, and which sets a second control threshold value greater than the first control threshold value as the control threshold value when the traveling state is detected as the understeer state.

2. The rollover suppression control apparatus according to claim 1,
    wherein the second control threshold value is set according to a degree of the understeer state of the vehicle.

3. The rollover suppression control apparatus according to claim 1, further comprising:
    a braking amount setting unit which sets a first braking amount as an amount of the braking force when the traveling state is detected as the non-understeer state, and which sets a second braking amount smaller than the first braking amount as the amount of the braking force when the traveling state is detected as the understeer state.

4. A rollover suppression control method comprising:
    detecting whether a traveling state of a vehicle is a understeer state or a non-understeer state;
    setting a first control threshold value as a control threshold value when the traveling state is detected as the non-understeer state, and setting a second control threshold value greater than the first control threshold value when the traveling state is detected as the understeer state;
    detecting a rollover state value indicating that the vehicle is under rollover tendency;
    comparing the detected rollover state value with the set control threshold value; and
    performing a rollover suppression control of applying braking force to a wheel of the vehicle to suppress rollover of the vehicle when the detected rollover state value is greater than the control threshold value.

* * * * *